J. R. WALSH.
Street-Car Draw-Bar.
No. 197,532. Patented Nov. 27, 1877.
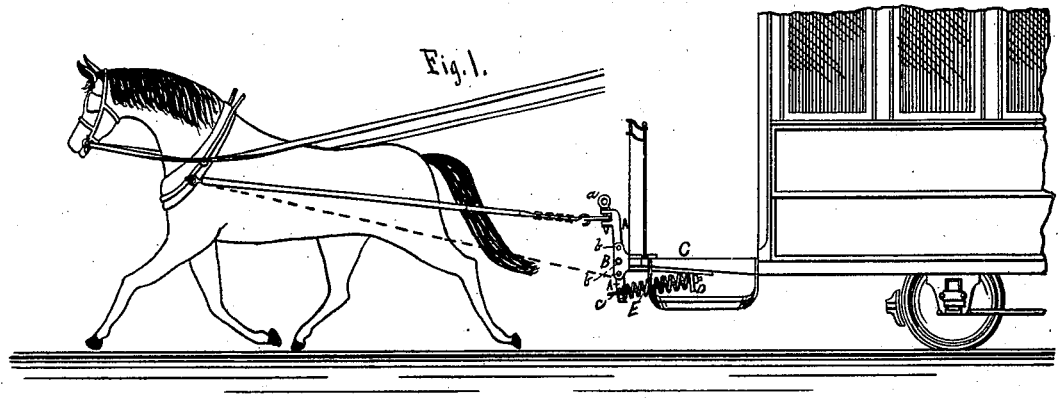
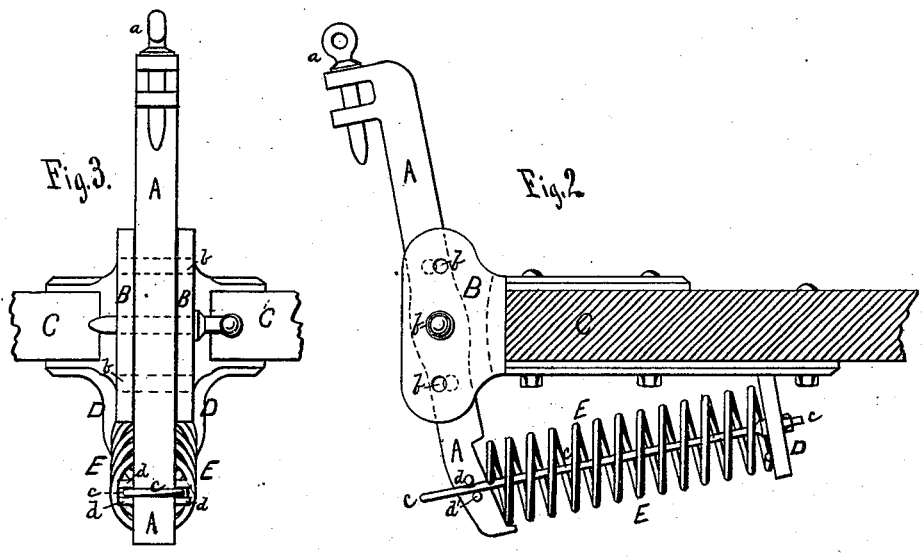
Witnesses.
C. N. Woodward
L. H. Starkey
James Robertson Walsh,
Inventor, By
Louis Feeser & Co. Attys.

UNITED STATES PATENT OFFICE.

JAMES R. WALSH, OF ST. PAUL, MINNESOTA.

IMPROVEMENT IN STREET-CAR DRAW-BARS.

Specification forming part of Letters Patent No. 197,532, dated November 27, 1877; application filed October 13, 1877.

*To all whom it may concern:*

Be it known that I, JAMES ROBERTSON WALSH, of St. Paul, in the county of Ramsey and State of Minnesota, have invented certain new and useful Improvements in Street-Car Draw-Bars, which invention is fully set forth in the following specification and accompanying drawings, in which—

Figure 1 is a representation of a portion of a street-car with my device attached thereto. Fig. 2 is an enlarged side elevation; Fig. 3, a front elevation of the draw-bar and lever; and Fig. 4 shows a slight modification of the device.

This invention relates to the draw-bars of street-cars; and consists in using a pivoted lever in place of the ordinary bar, whereby the whiffletree may be elevated until the line of draft is nearly even with the horse's shoulders, as hereinafter described.

The invention further consists in the manner of attaching and operating a spring to lessen the strain upon the horse in starting the car, as hereinafter fully set forth.

The ordinary draw-bar of a street-car is attached on a line with or beneath the platform, which brings the line of draft very low down, and subjects the horse to a double strain—viz., backward and downward.

This downward pull has a tendency to lift the forward end of the car, and must necessarily be very unpleasant to the horse, and the only way to avoid this difficulty is to elevate the line of draft; and this is the main object of my invention. This I accomplish by means of a lever, A, pivoted in a frame, B, secured to the platform C of the car.

The upper end of this lever A is provided with the usual coupling-pin $a$, by which the horse is attached, while the lower end passes through a looped rod, $c$, which runs back either side of the lever, and is secured in a plate or hanger, D, upon the frame B, as shown.

E is a spring surrounding the rod $c$, and held by it between the lever A and hanger D. By this arrangement the lever is kept pressed forward at its lower point, so that when the horse is started the spring, gradually yielding, will allow the car to start slowly, and prevent the unpleasant jarring which occurs when no spring is used.

The lever A and frame B will be provided with a number of holes, $b\ b$, by which the length of the lever may be adjusted to suit horses of different sizes and strength, and varying weight of load.

The lever A is provided with pins $d\ d$ near its lower point, which act as guides to keep the looped rod $c$ in position. The manner of securing the spring by the looped rod $c$ is a very important feature of my invention, as it not only acts as a support for the spring, but also as a guide for the lever. By this arrangement I accomplish two very important results—the elevation of the line of draft, and securing all the advantages of the spring.

Fig. 4 shows a slight modification of the device, consisting in placing the spring above the fulcrum instead of below it; but the action will be the same.

I am acquainted with the patent of Joseph Trent, February 8, 1870, No. 99,730, who shows a lever with its upper end attached to the dash-board of the car, while the lower end is attached to a spring, the whiffletree being attached between these two points; but this is not the equivalent of mine, as he accomplishes but one result, (the use of the spring,) while in mine two results are obtained—viz., the use of the spring, and the starting-lever.

By my arrangement the lever is pivoted directly to the platform, so that no extra weight or support is necessary.

Having thus described my invention, what I claim as new, and desire to secure by Letters Patent, is—

1. The hanger or frame B, secured to the platform C, in combination with the adjustable lever A, arranged and operating substantially as described.

2. The combination and arrangement of the looped rod $c$, spring E, and adjustable lever A, substantially as described.

In testimony whereof I have hereunto set my hand in the presence of two subscribing witnesses.

JAMES ROBERTSON WALSH.

Witnesses:
C. N. WOODWARD,
LOUIS WEESER.